United States Patent [19]
Lenczycki

[11] 3,905,107
[45] Sept. 16, 1975

[54] ENDOSSEOUS IMPLANTS
[76] Inventor: Joseph J. Lenczycki, 89 Florence Rd., Riverside, Conn. 06878
[22] Filed: Apr. 25, 1972
[21] Appl. No.: 247,420

[52] U.S. Cl. .................................................. 32/10 A
[51] Int. Cl. ............................................... A61c 13/00
[58] Field of Search ........ 32/10 A; 128/92 B, 92 BC

[56] References Cited
UNITED STATES PATENTS
3,497,953  3/1970  Weissman ........................ 32/10 A
3,738,008  6/1973  Edelman .......................... 32/10 A Primary Examiner—Louis G. Mancene
Assistant Examiner—J. Q. Lever
Attorney, Agent, or Firm—Friedman & Goodman, Esqs.

[57] ABSTRACT

An endosseous implant having a pair of prosthetic anchoring members which are generally similar to one another and are operatively associated for mutual pivotal articulation relative to one another. Each of the anchoring members includes a first portion for being anchored in a jaw-bone, and a second portion for being exposed relative to the jaw-bone and upon which dental prosthetic structure is mountable.

12 Claims, 7 Drawing Figures

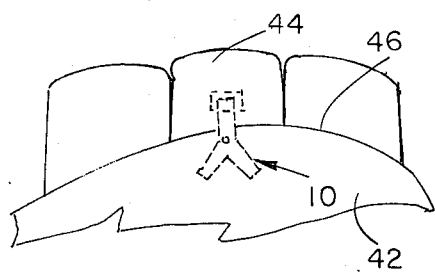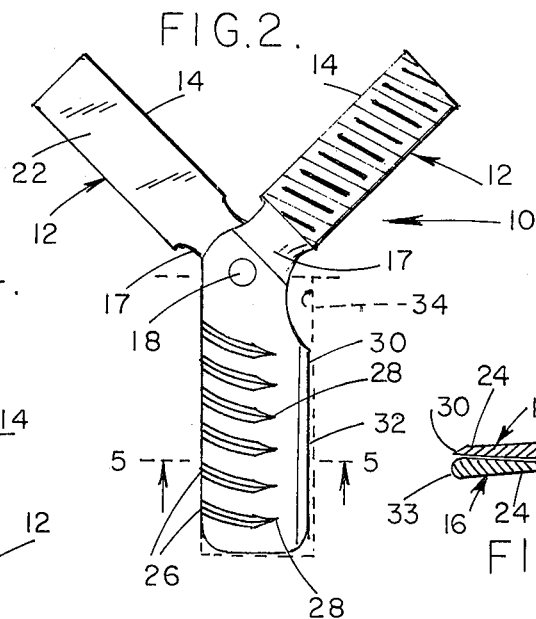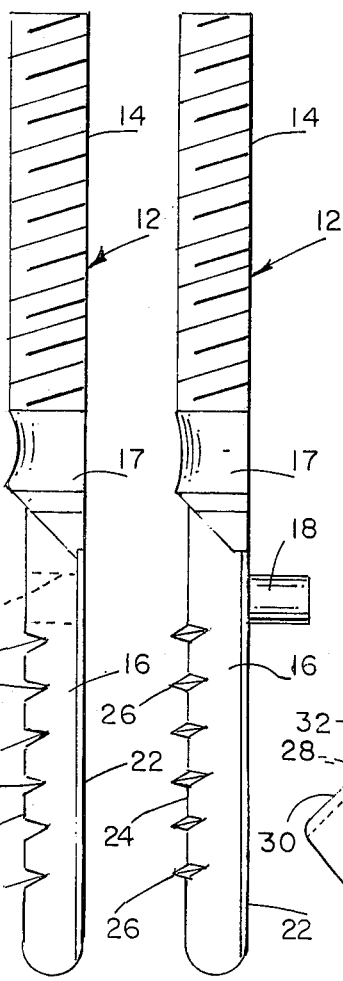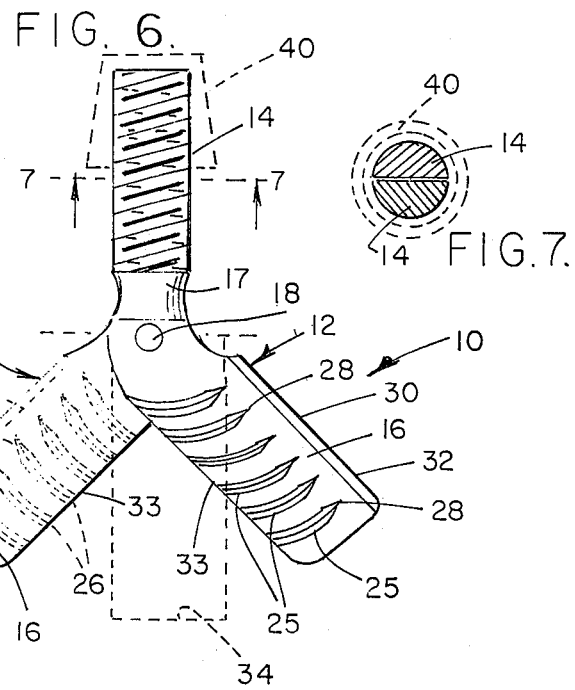

which is anchored prosthetic structure between adjacent natural teeth of the patient;

FIG. 2 illustrates an enlarged elevational view of the anchoring device pursuant to the present invention as inserted in an incision in the jaw-bone prior to being anchored therein;

FIGS. 3 and 4 illustrate respectively the two anchoring members which are generally of identical nature and which coact with one another in mutually pivotal articulation;

FIG. 5 illustrates a cross-sectional view taken along the line 5—5 in FIG. 2;

FIG. 6 illustrates the anchoring device pursuant to the present invention as anchored within the jaw-bone of the patient; and FIG. 7 illustrates a cross-sectional view taken along the line 7—7 of FIG. 6.

DETAILED DESCRIPTION OF THE INVENTION

Referring now to the drawings, and more particularly to FIGS. 2–4, the present invention relates generally to an endosseous implant or a prosthetic dental anchor denoted generally by the reference character 10. The dental anchor 10 includes a pair of co-acting anchoring members 12 which are operatively associated for mutually pivotal articulation relative to one another, as will be clarified below.

Each of the anchoring members 12 includes a stem portion, which may be a smooth or partially threaded semi-cylindrical upper portion 14, and a blade or bone-severing lower portion 16. The portions 14 and 16 are angularly offset by a large obtuse angle, between 120° and 150° for example, forming a "dog-leg" or "boomerang" shape. Portions 14 and 16 are separated from one another by a connecting intermediary smooth surfaced neck portion of reduced thickness, the purpose of which will be clarified below. The two anchoring members 12 are pivotally associated with one another by means of a provision for a cylindrical male projection or pivot pin 18 extending transversely from one of the anchoring members 12 which may be rotatably seated within a conforming cylindrical recess 20 provided in the other or female mate of the anchoring members 12.

Each of the blade or anchoring members 12 is preferably tapered and provided with generally flat mutually confronting inner surfaces 22 respectively and bone confronting outer surfaces 24 respectively, the latter which preferably include either arcuate grooves 25 or generally rib-like bone anchoring projections 26 which are partially arcuate and terminate in pointed ends 28 respectively proximate elongate leading knife-edges 30 respectively provided on each of the blade portions 16. Each knife edge 30 provided along one side of each of the blade portions 16 is formed as part of a beveled portion 32 formed along one side of each of the blade portions 16 such as by conventional means and is generally opposite an elongate rounded trailing or distal edge 33 provided along each of the blade portions 16. Grooves 25 or ribs 26 are formed as segments of circular arcs having the axis of pivot pin 18 as their center of curvature.

The pivotally connected members 12 may have their blade or anchoring portions 16 pivotally aligned in an insertion mode (FIG. 2) and alternatively their post or stem portions 14 may be aligned in a service mode (FIG. 6), juxtaposed to receive a coping or tapered socketed cap 40 cooperating with the bridge or denture to be anchored.

The dental surgical operation for implanting the dental anchor 10, pursuant to the present invention, may be effected rapidly and with simplicity. In this respect, an incision is formed in the jaw-bone of a patient of sufficient length, width and breadth for simultaneously accommodating the bone severing lower portion 16 of each of the anchoring members 12 in the insertion mode as illustrated in FIG. 2, the incision being denoted generally by the reference character 34. In this respect, as indicated above, the anchoring members 12 cooperate with one another in mutually pivotal articulation and, therefore, because of the angularly inclined relationship of the upper portion 14 with that of the lower portion 16 of each of the anchoring members 12, the anchoring members 12 being generally identical in configuration, the bone severing lower portion 16 of each of the anchoring members 12 may be brought easily into and out of longitudinal alignment with one another, FIG. 2 illustrating the longitudinal alignment of each of the bone severing lower portions 16 with one another and the absence of alignment of each of the semi-cylindrical upper portions 14 respectively of the anchoring members 12 in the insertion mode of the device. With the bone severing lower portions 16 being in longitudinal alignment with one another, the latter portions 16 may be inserted properly into the incision 34 provided in the jaw-bone of the patient in a manner illustrated in FIG. 2, whereupon the anchor 10 is in a condition for further manipulation by the dental surgeon.

In this respect, the angularly inclined relationship of the upper portion 14 with that of the lower portion 16 of each of the anchoring members 12 permits the upper portions 14 respectively, when squeezed or converged toward one another, so as to be brought into longitudinal alignment with one another in the service mode illustrated in FIG. 6, to swing or diverge the bone severing lower portions 16 away from one another and out of longitudinal alignment to slice edgewise through the jawbone and thereby expand the incision 34 in the jaw-bone. Because of the provision of the knife-edges 30 provided respectively on each of the bone severing lower portions 16 of each of the anchoring members 12, as the bone severing lower portions 16 are swung out of longitudinal alignment with one another, the knife-edges 30 act to cut further into the jaw-bone and expand the incision 34 to effectively permit the upper portions 14 to swing the lower portions 16 out of longitudinal alignment. Moreover, because of the provision of the grooves 25 or rib-like bone anchoring projections 26, the latter, having both pointed ends 28 and generally arcuate extents, respectively, act as anchoring surfaces for more effectively retaining the bone severing lower portions 16 of the anchoring members 12 in fixed relation internally of the jaw-bone, in the expanded incision 34 of the latter, thereby resulting in what may be characterized as the prosthetic dental anchor 10 being partially wedged within the jaw-bone substance.

In order to retain this relationship of the anchoring members 12 with one another, there is provided a coping 40 which may be a tapered socketed cap or a cylindrical internally threaded fastener which may be threadedly or wedgingly seated upon the cylindrical extent presented by the now longitudinally aligned upper

ENDOSSEOUS IMPLANTS

BACKGROUND OF THE INVENTION

The present invention relates generally to improvements for dental prosthetic structures, and more particularly to an endosseous implant which when anchored within an incision formed in a patient's jaw-bone, will firmly secure prosthetic structure in position.

As is commonly understood, prosthetic structure such as an artificial tooth is often either secured to adjacent natural teeth of the patient by appropriate wire fasteners and the like, or, alternatively, an incision is formed in the jaw-bone of the patient so as to permit anchoring of an implant device which is to be partially exposed relative to the jaw-bone and upon which is mountable prosthetic structure. In either instance, there remain serious drawbacks associated with the particular conventional methods and devices for appropriately securing prosthetic structure.

In this respect, whenever prosthetic structure is secured such as by means of wires and the like to the adjacent natural teeth of the patient, there is a significant increase in the forces which are transmitted to these natural teeth during mastication and this may result in possible damage to the natural teeth themselves or possibly to the prosthetic structure. In the other instance, whenever an anchoring device, of conventional nature, is implanted within the jaw-bone, as those skilled in the art readily understand, since these implants are extremely small and require very careful manipulation of a plurality of cooperating elements which are somewhat complex in nature, the operation of implanting the anchoring device is time-consuming, complex and often less than most reliable. This is particularly true of "subperiosteal" dental implants, which require slitting and reflection or back-folding of the tissue in successive operations to make jawbone impressions and to anchor cast mounting plates with screws to the bone beneath the gum.

Endosseous dental implants provide simpler auxiliary supports embedded directly in the jaw bone, and they serve to anchor removable full dentures, partial or "bridge" dentures replacing a group of missing teeth, and cantilever or posterior bridges having no natural teeth behind them. Bridges or partial dentures normally "bridge" spaces between natural teeth, which serve to anchor the bridge in place at both ends. Long-span bridges replacing three, four or more extracted teeth place unduly severe loads on the adjacent anchoring teeh. Endosseous implants serve to stabilize such bridges, providing long useful lives without risk of damage to adjacent natural teeth. Endosseous implants provide the same anchoring, stabilizing function for removable full dentures, enhancing their usefulness to the wearer.

Posterior or cantilever bridges can be anchored to natural teeth only at their forward ends, and the enormous crusing leverage applied through the molars by the jaws impose severe loads on such bridges. Intermediate anchoring of a cantilever bridge on an endosseous implant supplies much-needed stabilizing support.

Threaded posts or studs, pointed spikes, set screws, and similar devices have been proposed for anchoring dental implants in U.S. Pat. Nos. 3,386,169; 3,436,826; 3,499,222; 3,473,222 and 3,548,499. A serious disadvantage of such conventional devices has been the weakening of the supporting bone by large drilled mounting apertures.

U.S. Pat. Nos. 3,465,441 shows flat spade-shaped wedge-blade implants developed by Dr. Leonard I. Linkow which are driven into a narrow slot milled with a tapered drill along the ridge of the jaw by the oral implantologist, minimizing the drilled diameter or buccolingual width of jaw bone removed. See Linkow and Chercheve, Theories and Techniques of Oral Implantology (Mosby Co., St. Louis, 1970). In recent years these Linkow implants have gained increasing popularity and success, although they require firm, solid wedging implantation to avoid failure. Bernard Weissman in U.S. Pat. No. 3,497,953 shows an implant structure with spreadable engaging elements deployed laterally by an advancing threaded core, providing an enlarged anchoring area exceeding that of the implant aperture, but which incorporates a number of interfitting cooperating parts.

The present invention carries forward the concepts and significantly surpasses the effectiveness of the Linkow and Weissman implants, by drastically reducing the size of the drilled aperture in the bone, while greatly increasing the endosseous anchoring area of the implant structure.

SUMMARY OF THE INVENTION

Accordingly, it is an object of the present invention to provide an andosseous implant, of improved nature, upon which may be mounted prosthetic structure, which implant will diminish to a great extent, if not entirely, stress generally imposed against adjacent natural teeth of a patient.

It is another object of the present invention to provide an endosseous implant having a minimal number of operative elements which cooperate with one another with great simplicity and results, when properly anchored, in an extremely effective support upon which may be mounted prosthetic structure.

It is a further object of the present invention to provide an endosseous implant which when anchored in the jaw-bone of a patient obviates, to a great extent, discomfort often associated with implants of this nature when surrounding gum tissue is in contact therewith.

To this end, the present invention relates generally to an endosseous implant comprising a pair of prosthetic anchoring members for jaw-bone implantation and operatively associated with one another for movement in mutually opposing relation; each of said anchoring members including a first anchoring blade portion for being anchored in a jaw-bone, and a second post or stem portion for being exposed relative to the jaw-bone and upon which dental prosthetic structure is mountable, and second post portion of each of said anchoring members being operatively associated with one another for displacing said first blade portion of each of said anchoring members oppositely relative to one another into anchoring relation in the jaw-bone.

BRIEF DESCRIPTION OF THE DRAWINGS

With the above and additional objects and advantages in view, as will hereinafter appear, this invention comprises the devices, combinations and arrangements of parts hereinafter described and illustrated in the accompanying drawings of a preferred embodiment in which:

FIG. 1 illustrates an enlarged fragmentary schematic elevational view of a portion of a patient's jaw-bone in portions 14 in their service mode illustrated in FIGS. 6 and 7, which cylindrical extent is exposed relative to the jaw-bone 42 denoted in FIG. 1. Once the cap 40 is connected, an artificial tooth or the like 44 may be secured to the exposed portion of the anchor 10 in a conventional manner. Clearly, the presence of the smooth surfaced neck portion 17 acts to promote healing and obviate, to a substantial degree, discomfort of the gum-tissue surface 46 overlying the jaw-bone 42 and contacting or rubbing thereagainst.

The insertion of anchor 12 with smooth neck 17 positioned within the drilled aperture in the hard outer cortical bone brings anchoring blade portions 16 into the softer or cancellus bone, producing optimum wedging, anchoring engagement. A predetermined length of either blade portion 16 can be cut away in advance if desired, to avoid wedging impingement into a sinus area or the nerves and blood vessels in a mandibular canal.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. An endosseous implant for jawbone implantation comprising a pair of prosthetic anchoring members arranged in juxtaposed relation and pivotally connected to each other at intermediate portions thereof, each of said anchoring members including an anchoring blade portion and a stem portion including an obtuse angle therebetween about a respective intermediate portion, the anchoring blade portions of said two anchoring members being pivotally positionable into closely juxtaposed angular position of the latter and movable to bring the stem portions of said two anchoring members into closely juxtaposed alignment in an other relative angular position of the latter, whereby said blade portions can be disposed within a hole made in a jawbone in said one relative position of said anchoring members and the latter can be pivoted relative to each other to said other relative angular position to separate said aligned blade portions and to anchor the latter within the jawbone and to align said stem portions externally of the jawbone to provide an extension to which a prosthetic device can be fixed.

2. An endosseous implant as defined in claim 1, wherein said obtuse angle is in the range between 120° and 150°.

3. An endosseous implant as claimed in claim 1, wherein said blade portions of said anchoring members include elongate knife-edges movable in opposing directions away from one another when said stem portions are brought into longitudinal alignment.

4. An endosseous implant as claimed in claim 1 wherein said pair of prosthetic anchoring members are generally similarly configurated to one another.

5. An endosseous implant as claimed in claim 4 wherein at least said blade portions include mutually confronting flat surfaces generally slidable relative to one another, each terminating respectively in said knife-edge.

6. An endosseous implant as claimed in claim 5 wherein each of said blade portions includes a bone-confronting opposite surface having a bevelled portion terminating in said knife-edge.

7. An endosseous implant as claimed in claim 6 wherein said bone confronting opposite surface of each of said blade portions includes rib-like bone-anchoring projections.

8. An endosseous implant as claimed in claim 6 wherein said bone-confronting opposite surface of each of said blade portions includes anchoring grooves extending arcuately across each of said blade portions in a generally parallel array.

9. An endosseous implant as claimed in claim 7 wherein said rib-like bone-anchoring projections extend arcuately laterally across each of said blade portions in a generally parallel array and terminate proximate each said knife-edge with respective pointed ends.

10. An endosseous implant as claimed in claim 4 wherein each of said stem portions is partially threaded, is semi-cylindrical and cooperates with the other when in longitudinal alignment for presenting a threaded cylindrical extent to receive a conformingly internally threaded fastener.

11. An endosseous implant as claimed in claim 1 wherein said stem and blade portions of each of said members are separated from one another through the intermediary of a smooth-surfaced neck portion of reduced thickness.

12. An endosseous implant as claimed in claim 1 wherein each of said stem portions are semi-cylindrical, include flat confronting surfaces slidable relative to one another, and rounded threaded surfaces which cooperate to form a threaded cylinder.

* * * * *